United States Patent [19]

Black

[11] 4,315,727
[45] Feb. 16, 1982

[54] ROTARY BALL LOCK

[75] Inventor: John W. Black, Hickory Corners, Mich.

[73] Assignee: Pemco-Kalamazoo, Inc., Kalamazoo, Mich.

[21] Appl. No.: 206,806

[22] Filed: Nov. 14, 1980

[51] Int. Cl.³ .............................................. B29F 1/03
[52] U.S. Cl. ................................. 425/563; 425/451.9; 425/595
[58] Field of Search ...................... 425/451.9, 595, 563

[56] References Cited

U.S. PATENT DOCUMENTS

| | | | |
|---|---|---|---|
| 2,879,545 | 3/1959 | Bailey | 18/43 |
| 2,916,768 | 12/1959 | Quéné | 425/451.9 |
| 3,611,499 | 10/1971 | Getty | 425/451.9 |
| 3,986,804 | 10/1976 | Albright | 425/190 |
| 3,986,805 | 10/1976 | Haines | 425/242 R |

*Primary Examiner*—Thomas Pavelko
*Attorney, Agent, or Firm*—Blanchard, Flynn, Thiel, Boutell & Tanis

[57] ABSTRACT

A mechanism for locking together two mold sections includes one or more lock elements rotatably mounted on one of the mold sections, and a respective cylindrical tie rod for each lock element mounted on the other mold section. Each lock element has a cylindrical opening therethrough along its axis of rotation, and a plurality of lock balls disposed in recesses in the surface of the opening so as to form radially inwardly extending hemispherical projections on said surface. Each tie rod is of a diameter slightly less than that of the corresponding cylindrical opening in the lock element, such that the tie rod is axially slidably receivable within the opening. The surface of each tie rod has a plurality of longitudinal guide grooves radially aligned with the lock balls in the surface of the opening, and each lock ball is slidingly received in a guide groove when the tire rod is slidably disposed in the opening. Intersecting each guide groove at substantially a right angle is a lock groove. When the mold sections are in a closed position, each lock ball will be disposed at such an intersection, whereby rotation of the lock element relative to the tie rod will cause each lock ball to enter a lock groove, preventing relative axial movement of the tie rod relative to the lock element and effecting a secure clamping engagement of the mold sections in the closed position.

9 Claims, 7 Drawing Figures

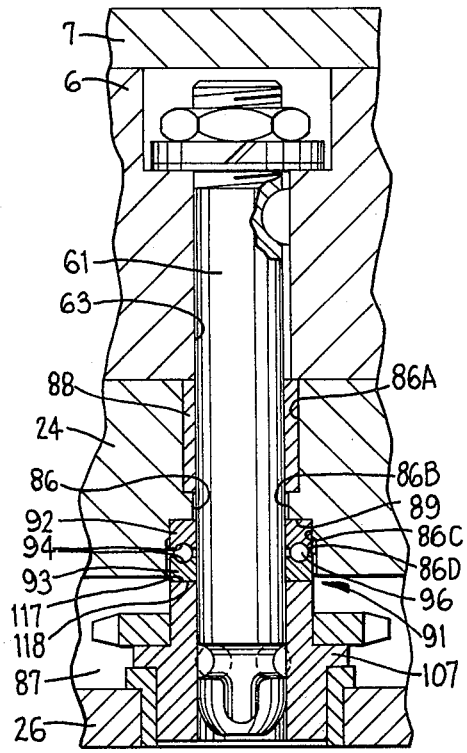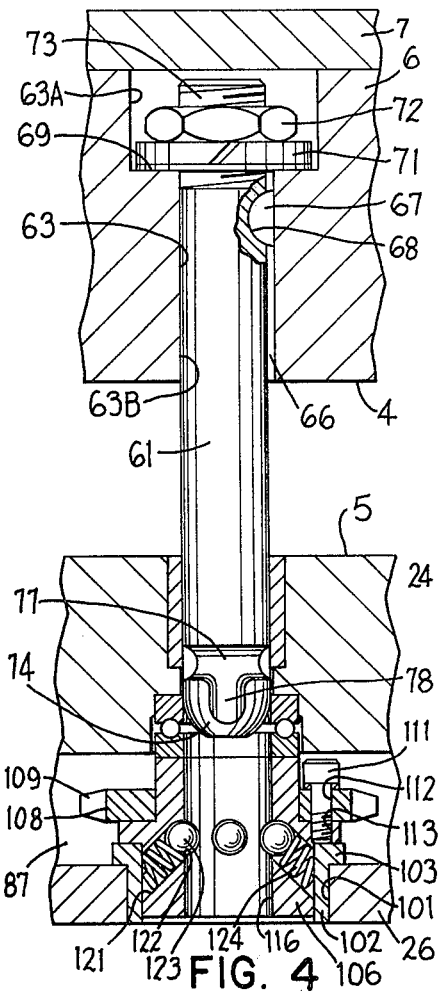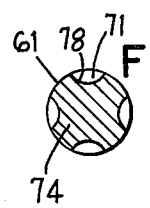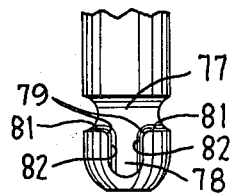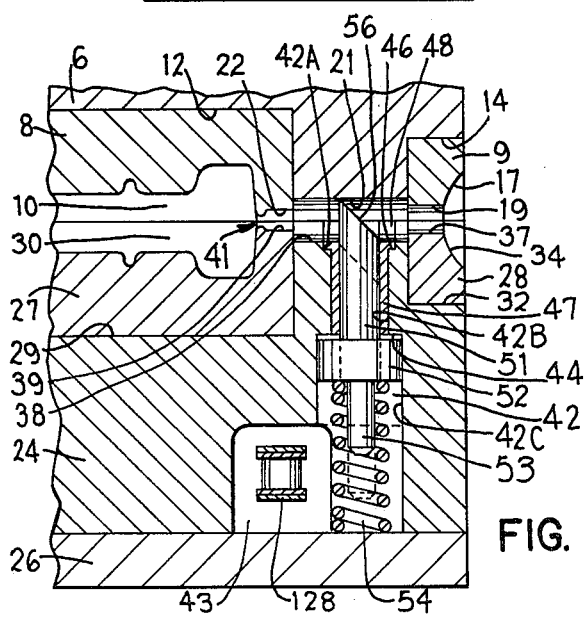

ROTARY BALL LOCK

FIELD OF THE INVENTION

This invention relates to a machine for injection molding items from a thermoplastic or similar material, and more particularly to a mechanism for securely locking the halves of the injection mold together during the injection and curing steps of the injection molding process.

BACKGROUND OF THE INVENTION

The improved lock mechanism of the present invention arose out of the need to securely lock the halves of an injection mold together against the high pressures generated during injection and curing of a thermoplastic or similar material, which pressures can easily generate forces exceeding 25 tons. The known methods of achieving this result, such as those disclosed in U.S. Pat. Nos. 2,879,545 and 3,590,437 have not proved to be satisfactory in all respects.

Accordingly, it is an object of this invention to provide a simple and effective mechanism for tightly holding together the sections of an injection mold during the injection and curing steps of the injection molding process.

It is a further object of this invention to provide a mechanism, as aforesaid, which is small in both size and weight, may be self-contained within the mold, and which is inexpensive to manufacture.

It is a further object of this invention to provide a mechanism, as aforesaid, which may be smoothly and effortlessly operated under either a manual or mechanical control, but which will securely lock together the mold sections against the high pressures generated during the injection and curing of a thermoplastic or similar material.

It is a further object of this invention to provide a mechanism, as aforesaid, which is capable of rapid engagement and disengagement, to facilitate maximum production output and to reduce the unit of time per operating personnel allocable to each injection operation.

SUMMARY OF THE INVENTION

The foregoing objects and purposes of the invention are met by providing a mechanism for locking together two mold sections which includes one or more lock elements rotatably mounted on one of the mold sections, and a respective cylindrical tie rod for each lock element mounted on the other mold section. Each lock element has a cylindrical opening therethrough along its axis of rotation, and a plurality of lock balls disposed in recesses in the surface of the opening so as to form radially inwardly extending hemispherical projections on said surface. Each tie rod is of a diameter slightly less than that of the corresponding cylindrical opening in the lock element, such that the tie rod is axially slidably receivable within the opening. The surface of each tie rod has a plurality of longitudinal guide grooves radially aligned with the lock balls in the surface of the opening, and each lock ball is slidingly received in a guide groove when the tie rod is slidably disposed in the opening. Intersecting each guide groove at substantially a right angle is a lock groove. When the mold sections are in a closed position, each lock ball will be disposed at such an intersection, whereby rotation of the lock element relative to the tie rod will cause each lock ball to enter a lock groove, preventing relative axial movement of the tie rod relative to the lock element and effecting a secure clamping engagement of the mold sections in the closed position.

BRIEF DESCRIPTION OF THE DRAWINGS

Further objects and purposes of this invention will be apparent to persons acquainted with apparatus of this general type upon reading the following specification and inspecting the accompanying drawings, in which:

FIG. 3 is an enlarged view of the sectioned portion of FIG. 2;

FIG. 4 is an enlarged view of the sectioned portion of FIG. 2 in a different position of operation;

FIG. 5 is a sectional view taken along the line V—V of FIG. 2;

FIG. 6 is an end view of a tie rod utilized in the injection mold of FIG. 1; and FIG. 7 is a side view of a fragment of the tie rod of FIG. 6.

Figure 1:
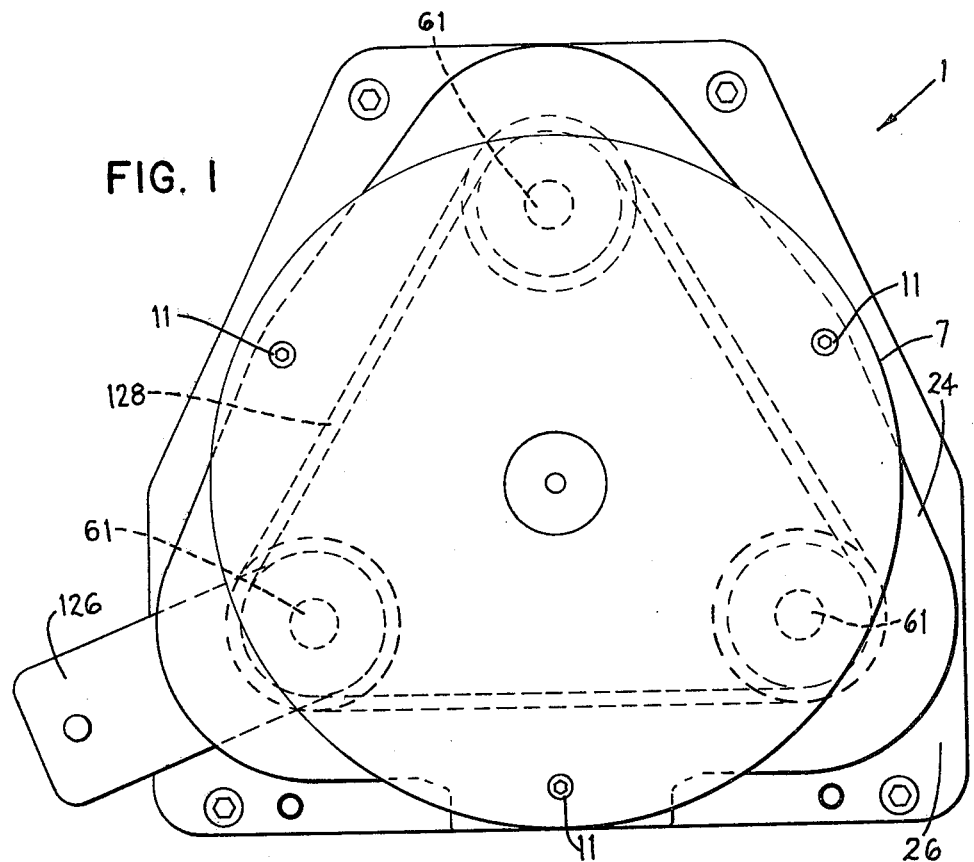
FIG. 1 is a top view of an injection mold embodying the present invention.

Certain terminology will be used in the following description for convenience and reference only and will not be limiting. The words "up" and "down" will designate directions in the drawings to which reference is made. The words "in" and "out" will refer to directions toward and away from, respectively, the geometric center of the device and designated parts thereof. Such terminology will include the words specifically mentioned above, derivatives thereof and words of similar import.

DETAILED DESCRIPTION

Figure 2:
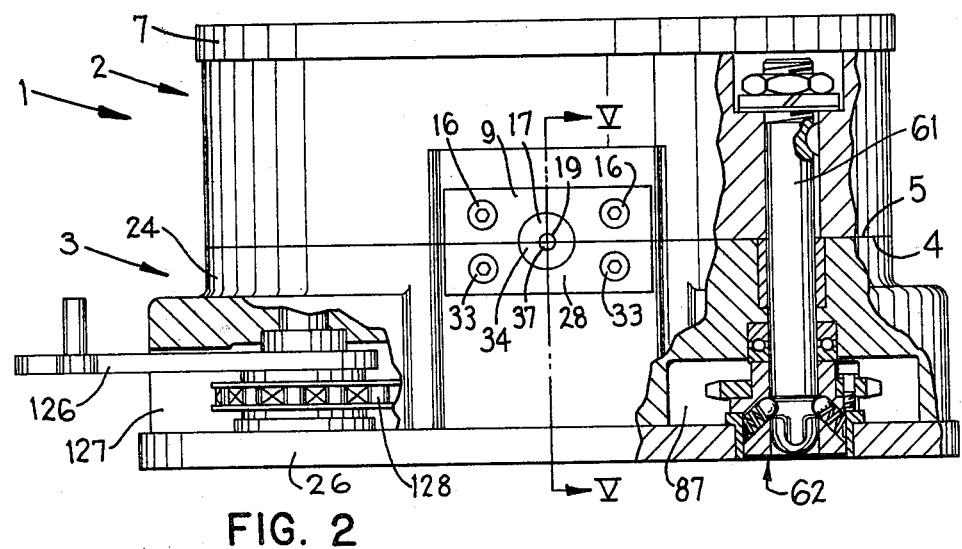
FIG. 2 is a front view of the injection mold of FIG. 1, partially in section and disclosing the details of the present invention.

FIGS. 1 and 2 illustrate an injection mold, designated generally by the reference numeral 1. The injection mold 1 is preferably utilized in a machine having a plurality of such injection molds secured to the top of a turntable at spaced peripheral intervals, such as is disclosed in my application entitled "Method and Apparatus for Injection Molding" and filed concurrently herewith, and my U.S. Pat. No. 4,111,623. The injection mold 1 comprises an upper mold part 2 and a lower mold part 3. The upper mold part 2 is movable vertically with respect to the lower mold part 3 between a closed position wherein the planar surfaces 4 and 5 are in engagement with each other as shown in FIG. 2, and an open position wherein the planar surfaces 4 and 5 are spaced vertically from one another, as shown in FIG. 4. The vertical movement of the upper mold part 2 relative to the lower mold part 3 is effected by conventional mechanical apparatus not illustrated in the drawings.

The upper mold part 2 comprises an upper mold member 6, a top plate 7, an upper cavity plate 8 and an upper nozzle seat 9 (FIG. 5). The top plate 7 is secured to the top of upper mold member 6 by a plurality of socket head screws 11. The upper cavity plate 8 has a mold cavity 10, is disposed within a cylindrical recess 12 provided in the planar surface 4 of the upper mold member 6, and is secured thereto in a convenient manner, such as set-screws, not illustrated. The upper nozzle seat 9 is disposed within a recess 14 provided in the lower peripheral edge of upper mold member 6, and is affixed thereto by two socket head screws 16 (FIG. 2).

The outer surface of the nozzle seat is flush with the outer surface of the upper mold member 6. A recess 17 is provided in the nozzle seat 9, and communicates with the mold cavity 10 through inwardly extending and aligned grooves 19, 21 and 22 provided in the bottom surfaces of the nozzle seat 9, mold member 6 and cavity plate 8, respectively (FIG. 5). The grooves, 19, 21 and 22 are of semicircular cross-section, and the cross-section of groove 21 is preferably larger than that of grooves 19 or 22.

The lower mold part 3 comprises a lower mold member 24, a bottom plate 26, a lower cavity plate 27 and a lower nozzle seat 28 (FIG. 5), which are arranged to form substantially a mirror image of the upper mold part 2. Specifically, the bottom plate 26 is secured to the lower mold member 24 in a suitable manner, not illustrated, such as a plurality of screws. The lower cavity plate 27 has a mold cavity 30 therein and is disposed within a cylindrical recess 29 provided in the planar surface 5 of the lower mold member 24 so that when the mold parts 2 and 3 are in the aforementioned closed position, the cavity 30 is aligned with the cavity 10 in the upper cavity plate 8. The cavity plate 27 is secured to the mold member 24 in a convenient manner, such as by socket head set-screws, not illustrated. The lower nozzle seat 28 is disposed within a recess 32 provided in the peripheral edge of the lower mold member 24, such that the upper and lower nozzle seats 9 and 28 are aligned and disposed against each other when the mold parts 2 and 3 are in the aforementioned closed position, as shown in FIGS. 2 and 5. As with the nozzle seat 9, the outer nozzle seat 28 is flush with the outer surface of the lower mold member 24. A recess 34 is provided in the nozzle seat 28, aligned with and in communication with the recess 17 in the upper nozzle seat 9, as shown in FIGS. 2 and 5. The recess 34 communicates with the mold cavity 30 through inwardly extending and aligned grooves 37, 38 and 39 provided in the top surfaces of the nozzle seat 28, mold member 24 and cavity plate 27, respectively (FIG. 5). The grooves 37, 38 and 39 are aligned to lie beneath the grooves 19, 21 and 22, respectively, and preferably have corresponding semi-circular cross-sections. The mating grooves 22 and 39 open into the mold cavity 30 through an orifice 41, as shown in FIG. 5, which orifice is smaller in diameter than the diameter of the mating grooves 22 and 39.

A cylindrical bore 42 extends from the groove 38 vertically down through the lower mold member 24 to a recess 43 provided in the bottom surface of the mold member 24. The upper portion 42A and lower portion 42C of the bore 42 are both of greater diameter than the central portion 42B, thereby defining an upwardly facing annular shoulder 46 between the portions 42A and 42B, and a downwardly facing annular shoulder 44 between the portions 42B and 42C. A cylindrical shut-off bushing 47 having an annular flange 48 at its upper end is coaxially and snugly disposed within the upper bore portion 42A, with the bottom surface of the flange 48 resting on the shoulder 46. Opposed walls of the annular flange 48 have notches therein so that the diameter of the mating grooves 21 and 38 is uniform throughout their length.

Coaxially disposed within the shut-off bushing 47 and axially slidable relative to the bushing 47 is a shut-off pin 51 having an annular flange 52 at its lower end and having a projection 53 of small diameter extending downwardly below the flange 52. The upper side of the flange 52 engages the shoulder 44 of the bore 42 to limit upward movement of the pin 51. A helical spring 54 having a diameter less than that of the lower bore portion 42C but greater than that of the downward projection 53 is vertically disposed in the lower bore portion 42C with one end resting on the upper surface of the bottom plate 26 and the other end encircling the downward projection 53 of the pin 51 and engaging the flange 52 to urge the pin 51 upwardly in the bore 42. The top of the pin 51 is defined by a surface 56 inclined at an angle of approximately 45° with respect to the plane dividing the mold parts 2 and 3, namely the plane of the surfaces 4 and 5 and facing toward the nozzle seats 9 and 28. When the mold parts 2 and 3 are in said closed position, the tip 57 of the pin 51 will be urged against the top of the groove 21 by the spring 54, such that the top of flange 52 is spaced slightly from the shoulder 44 and the inclined surface 56 is entirely blocking the passageway defined by the grooves 21 and 38. It is to be noted that the inclined surface 56 faces the inlet opening defined by the grooves 19 and 37.

As shown in FIG. 2 and by broken lines in FIG. 1, the mechanism for locking together the mold parts 2 and 3 includes three cylindrical tie rods 61 and three lock assemblies 62 (FIG. 2), each cooperable with a respective one of the tie rods 61. The tie rods 61 will now be described in detail, and then the lock assemblies 62 will be described in detail.

As illustrated in FIG. 4, each tie rod 61 is disposed in a cylindrical rod bore 63 extending vertically through the upper mold member 6. The lower portion 63B of the bore 63 is provided with a vertically extending keyway 66, and rotation of the tie rod 61 with respect to the upper mold member 6 is prevented by a key 67 slidably received within the keyway 66 and engaged in a recess 68 provided in the surface of the tie rod 61. The upper portion 63A of the bore 63 is of a larger diameter than the lower portion 63B, resulting in an upwardly facing annular shoulder 69. Downward movement of the tie rod 61 with respect to the upper mold member 6 is prevented by a washer 71 encircling the tie rod 61 and disposed against the shoulder 69 of the upper mold member 6, and a nut 72 threadedly engaging the threaded upper end 73 of the tie rod 61. Adjusting the nut 72 permits adjustment of the vertical position of the tie rod 61 relative to the mold member 6.

The tie rod 61 is provided with a tapered lower end surface 74. Spaced slightly upwardly from the end surface 74 is an annular lock groove 77 of semicircular cross-section which encircles the tie rod 61 (FIG. 3). Also provided in the surface of the tie rod 61 are four longitudinally extending guide grooves 78 of semicircular cross-section which extend from the annular groove 77 to the tapered end surface 74 and are spaced circumferentially from each other around the periphery of the tie rod 61 at 90° intervals (FIGS. 4 and 6). At the intersection of each guide groove 78 with the lock groove 77, beveled ramp surfaces 79 connect the lower side wall 81 of the lock groove 77 with the side walls 82 of the guide groove 78, as best shown in FIG. 7. The lower side walls 81 of the lock groove 77 also serve as bearing surfaces in a manner described hereinafter in detail.

The lock assembly 62 (FIG. 2) will now be described. As illustrated in FIGS. 2 and 3, a vertical lock bore 86 extends through the lower mold member 24 and opens into a recess 87 provided in the bottom surface of the lower mold member 24. The upper portion 86A of the bore 86 is of larger diameter than the central portion 86B, and snugly received within the portion 86A is a cylindrical guide bushing 88. Below the intermediate portion 86B of the bore 86 is a portion 86C of larger diameter, and a portion 86D of still larger diameter. Between the portions 86B and 86C is provided a downwardly facing annular shoulder 89. Snugly disposed in the portion 86C and against the shoulder 89 is an annular upper bearing race 92 of a thrust bearing 91. A short distance beneath the upper race 92 and aligned therewith is an annular lower race 93 of the thrust bearing 91. Disposed between the races 92 and 93 and riding in annular grooves 94 provided in the adjacent surface of each are a plurality of ball bearings 96. The lower portion 86D of the bore 86 has a diameter greater than the outside diameter of the lower bearing race 93, such that the lower bearing race 93 is free to rotate with respect thereto. The radially inner surfaces of the bore 86, the guide bushing 88 and the thrust bearing 91 are all coaxially aligned with each other and with the rod bore 63 in the upper mold member 6, and are of slightly larger diameter than a tie rod 61, such that a tie rod 61 may be slidably received therein in a manner described in detail hereinafter.

Coaxially aligned with the bore 86 in the lower mold member 24 is a circular opening 101 in the bottom plate 26 (FIG. 4). Snugly disposed within the opening 101 is a bushing 102 having an annular flange 103 at the upper end thereof disposed against the bottom plate 26 to prevent downward movement of the bushing 102 relative to the bottom plate 26. Journaled in the bushing 102 for rotation relative to the mold member 24 is a cylindrical lock element 106 having an outwardly extending annular flange 107 near its axial midpoint. The bottom of the flange 107 is disposed against the top of the flange 103 on the bushing 102 to prevent downward movement of the element 106 relative to the bushing 102. Encircling the lock element 106 just above the annular flange 107 is an annular sprocket wheel 108 having a plurality of teeth 109 about its periphery. The sprocket wheel 108 is secured to the lock element 106 by a plurality of bolts 111 circumferentially spaced around the lock element 106, passing vertically through bores 112 in the sprocket wheel 108, and threadedly engaging internally threaded openings 113 in the annular flange 107 of the cylindrical lock element 106. A cylindrical opening 116 having a diameter slightly greater than that of a tie rod 61 extends vertically through the lock element 106 and is coaxially aligned with the thrust bearing 91 and guide bushing 88, such that a tie rod 61 may be slidably received therein in a manner and for a purpose to be described hereinafter. The axial length of the lock element 106 is dimensioned so that the upper end 117 of the element 106 is disposed against the lower end 118 of the thrust bearing 91.

Extending upwardly and radially inwardly through the walls of the lock element 106 are four guide bores 121 circumferentially spaced at 90° intervals from each other about the lock element 106. The bores 121 each communicate with the opening 116 through an aperture 122, each aperture 122 being of slightly smaller diameter than the associated bore 121. A lock ball 123 having a diameter less than that of the bore 121 but greater than that of the aperture 122 is disposed in each bore 121 at the upper end thereof. A helical spring 124 is disposed in each bore 121 beneath the lock ball 123 and urges the lock ball 123 upwardly and inwardly, such that the lock ball protrudes into the opening 116 but is prevented from fully entering the opening 116 by the size of the aperture 122.

As shown in FIG. 2 and by broken lines in FIG. 1, a handle 126 is secured to one of the three lock elements 106 and extends horizontally to a point outside of the injection mold 1 through an opening 127 in the lower mold member 24. A chain 128 extending through the recesses 43 and 47 (FIGS. 2 and 5) drivingly connects all three sprocket wheels 108, such that movement of the handle 126 effects simultaneous rotary movement of all sprocket wheels 108 and the associated lock elements 106.

OPERATION

Although the operation of the device described above will be understood from the foregoing description by persons skilled in the art, a summary of such operation is now given for convenience.

An injection molding operation begins with movement of the mold parts 2 and 3 from an open position vertically spaced from each other, as shown for example in FIG. 4, to a closed position as shown for example in FIG. 2. As the mold parts 2 and 3 move toward the closed position, each tie rod 61 is axially slidably received within the guide bushing 88 and the thrust bearing 91, as shown in FIG. 4, and thence enters the lock element 106.

If, as the tie rod 61 slides into the lock element 106, the guide grooves 78 in the tie rod 61 are not radially aligned with the corresponding lock balls 123 provided in the lock element 106, the tapered end surface 74 of the tie rod 61 will contact the lock balls 123 and will force them downwardly and outwardly into the guide bores 121 against the force of the springs 124 as the tie rod 61 slides past the apertures 122, thereby preventing damage to the tie rod 61, the lock balls 123 or the lock element 106. Normally, however, each lock ball 123 will be radially aligned with a guide groove 78 as the tie rod 61 slides into a lock element 106, and will be slidingly received within that guide groove 78.

When the mold parts 2 and 3 reach the aforementioned closed position wherein the flat surfaces 4 and 5 engage each other, the plane containing the center of the lock balls 123 will be substantially coplanar with the plane containing the centerline of the annular lock groove 77. This relative positioning is preset during periodic maintenance procedures by adjusting the nut 72 threadedly engaging the top portion 73 of the tie rod 61 to effect a vertical repositioning of the tie rod 61 relative to the lock element 106.

The handle 126 is then turned under either manual or machine control, causing the chain 128 to act through the sprocket wheels 108 to simultaneously turn each of the lock elements 106 through a preselected arc, preferably about 45°. This rotation of each lock element 106 relative to its tie rod 61 will cause the bearing surfaces defined by the lock balls 123 to contact and climb a ramp surface 79 onto the bearing surface provided by the lower wall 81 of the lock groove 77, preventing axial movement of the tie rod 61 relative to the lock element 106 and firmly clamping the upper mold part 2 to the lower mold part 3. The thrust bearing 91 allows effortless rotation of the lock element 106 relative to the lower mold member 24 despite axial compression forces generated therebetween when the lock balls 123 ride up the ramp surfaces 79 into the annular lock groove 77.

With the mold parts 2 and 3 now securely locked together, an injection nozzle, not illustrated, is inserted into the seat formed by the recesses 17 and 34 in the nozzle seats 9 and 28, and injection material is forced under pressure through the channel formed by grooves 19 and 37 into the channel formed by grooves 21 and 38. The pressure of the material acts against the inclined surface 56 of the shut-off pin 51 and forces the shut-off pin 51 downwardly in the bore 42 against the force of the spring 54, thereby allowing the material to pass through the channel formed by grooves 22 and 39 and through the orifices 23 and 41, into the mold cavity formed by the upper and lower mold cavities 10 and 30. When the mold cavities 10 and 30 are full, the pressure in the channel formed by grooves 21 and 28 will equalize on opposite sides of the shut-off pin 51, and the force of the spring 54 will urge the shut-off pin 51 upwardly into its original position. The injection nozzle is then removed.

When the period of time required to cure the injected material has elapsed, the mold locking mechanism is released by reversing the locking procedure described above. Specifically, returning the handle 126 to its original position rotates each lock element 106 relative to the corresponding tie rod 61 until each lock ball 123 is again radially aligned with a lock groove 78, whereby the mold parts 2 and 3 can be separated and the molded item removed from the mold cavity plates 8 and 27.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination with a mold having two mold parts movable between an open position remote from each other and a closed position sealingly contacting each other, a mold locking mechanism for securely clamping said parts together in said closed position comprising:

a cylindrical tie rod extending between said mold parts and supported on one said mold part by first mounting means, the radially outer surface of said rod having at least one longitudinally extending guide groove and having at least one lock groove intersecting each guide groove at substantially a right angle, said rod having a ramp surface in said grooves at each said intersection thereof and a first bearing surface in each said lock groove adjacent each said ramp surface;

a lock element supported on said other mold part by second mounting means and having a cylindrical opening therein coaxially aligned with and of slightly larger diameter than said tie rod, the surface of said opening having at least one substantially hemispherical projection extending radially inwardly and having thereon a second bearing surface; and drive means for effecting relative rotation between said tie rod and lock element about the common axis of said rod and said opening;

whereby as said mold parts move to said closed position, said tie rod is axially slidably received in said lock element opening, each said hemispherical projection is slidably received within a said guide groove and is positioned at a said intersection of said guide and lock grooves when said mold parts reach said closed position, and said relative rotation of said tie rod and lock element by said drive means causes said second bearing surfaces on said projections to contact and be guided by said ramp surfaces onto said first bearing surfaces in said lock grooves, thereby effecting said secure clamping together of said mold parts in said closed position.

2. The combination according to claim 1, wherein each said substantially hemispherical projection comprises a spherical ball element disposed in a recess provided in said surface of said opening in said lock element.

3. The combination according to claim 2, including a plurality of said ball elements and recesses in said lock element, a plurality of said guide grooves on said tie rod, each of substantially semicircular cross-section, and a single annular lock groove of substantially semicircular cross-section circumferentially encircling said tie rod and intersecting each said guide groove.

4. The combination according to claim 3, wherein there are four said ball elements and recesses, disposed so that the geometric centers of said ball elements lie in a plane normal to the axis of said opening and are circumferentially spaced from each other on said surface at 90° intervals, and wherein there are four said guide grooves in the surface of said tie rod spaced circumferentially from each other at 90° intervals.

5. The combination according to claim 3, wherein each said recess is defined by a cylindrical guide bore of greater diameter than a said ball element communicating with said opening through an aperture of lesser diameter than a said ball element, said guide bore extending outwardly through said lock element such that the guide bore axis is angled away from said one mold part and lies in a plane containing the axis of said opening, and wherein a helical spring is disposed in each said guide bore and the ball element is positioned in said guide bore between said aperture and said spring, the spring being supported to continuously urge the ball element inwardly toward said aperture.

6. The combination according to claim 5, wherein:

a portion of said tie rod adjacent said first mold part is threaded;

said first mounting means comprise a cylindrical rod bore through said first mold part in which said tie rod is axially slidably received, a key engaging a recess in said tie rod and slidably received in a longitudinally extending keyway in the surface of said rod bore to prevent rotation of said tie rod relative to said one mold part, and nut means threadedly engaging said threaded portion of said tie rod and disposed against shoulder means provided in said rod bore to prevent axial movement of said tie rod toward said other mold part relative to said one mold part; and said second mounting means comprise a lock recess in said other mold part, means supporting the lock element in said lock recess for rotation about the axis of the opening in the element, a cylindrical lock bore extending through the portion of said other mold part lying between said recess and said one mold part and axially aligned with said tie rod such that the tie rod is slidably received therethrough when said mold parts move to said closed position, and an annular thrust bearing coaxially aligned with said lock bore and axially disposed between said lock element and said portion of said other mold part to prevent axial clamping forces generated by the locking mechanism from inhibiting rotation of the lock element.

7. The combination according to claim 6, wherein said locking mechanism comprises three pairs of said tie rods and lock elements, each pair spaced at equal distance from the others around a mold cavity formed in the mold parts.

8. The combination according to claim 7, wherein said drive means comprise a handle attached to one said lock element to effect said rotation of the element about the axis of the opening therein, a sprocket wheel affixed to each said lock element coaxial with the opening in the element, and a drive chain drivingly engaging the teeth on each said sprocket wheel to effect simultaneous rotation of all said lock elements in response to movement of said handle.

9. The combination according to claim 1, wherein:
a planar surface is provided on each said mold part and face each other, said planar surfaces sealingly engaging each other when said mold parts are in said closed position;
a mold cavity is provided in each said planar surface, and said mold cavities are aligned so as to form a single larger cavity when said mold parts are in said closed position;
one part of a bifurcated nozzle seat is provided on each said mold part at a peripheral edge of the facing surface such that the nozzle seat parts cooperate to form a nozzle seat when said mold parts are in said closed position;
a groove in each said planar surface extending between the associated nozzle seat part and mold cavity, and cooperating with the groove in the other mold part to form a channel connecting the nozzle seat and mold cavity when said mold parts are in said closed position;
a shut-off bore in one of said mold parts extending into the mold part substantially normal to the facing surface from a point in said groove intermediate the mold cavity and nozzle seat part;
a shut-off pin slidably disposed in said shut-off bore, the end surface of said pin adjacent said groove being inclined approximately 45° relative to said planar surfaces and oriented to face the nozzle seat, such that when said mold parts are in said closed position the presence of said end surface in said channel substantially blocks said channel; and
resilient means disposed in said shut-off bore for continuously urging said shut-off pin into the channel;
whereby material injected under pressure into said channel at the nozzle seat applies pressure to said inclined surface of said shut-off pin, thereby generating forces which slide the shut-off pin out of said channel against the urging of said resilient means such that passage of said material through the channel into the mold cavity is effected, and said resilient means exerting force sufficient to return the pin to its original position blocking said channel when the mold cavity has filled and the pressure of said material throughout said channel has equalized.

* * * * *